United States Patent [19]

Fox

[11] 4,366,131
[45] * Dec. 28, 1982

[54] HIGHLY REACTIVE IRON OXIDE AGENTS AND APPARATUS FOR HYDROGEN SULFIDE SCAVENGING

[75] Inventor: Irwin Fox, 37 Meadowbrook Country Club Estates, Ballwin, Mo. 63011

[73] Assignees: Irwin Fox, Ballwin, Mo.; Alvin Samuels, New Orleans, La.; David Samuels, St. Louis, Mo.

[*] Notice: The portion of the term of this patent subsequent to Jan. 20, 1998, has been disclaimed.

[21] Appl. No.: 226,159

[22] Filed: Jan. 19, 1981

Related U.S. Application Data

[63] Continuation-in-part of Ser. No. 44,026, May 31, 1979, Pat. No. 4,246,244, and a continuation-in-part of Ser. No. 963,797, Nov. 27, 1978, Pat. No. 4,246,243.

[51] Int. Cl.³ .................................................. B01D 53/34
[52] U.S. Cl. .................................... 423/231; 423/562; 423/632; 423/573 R
[58] Field of Search ............ 423/230, 231, 562, 573.6, 423/632, 633; 252/8.5 E, 8.55 EE; 75/25

[56] References Cited

U.S. PATENT DOCUMENTS

3,117,844  1/1964  Bureau ........................... 423/231 X
4,246,244  1/1981  Fox ................................. 423/231 X

FOREIGN PATENT DOCUMENTS

2248871  5/1975  France ............................ 423/231

Primary Examiner—Earl C. Thomas
Attorney, Agent, or Firm—Jerome A. Gross

[57] ABSTRACT

Substantially dry iron oxide particles having a high surface area, a high kinetic "K" value and composed of a crystalline phase of $Fe_3O_4$ together with an amorphous $Fe_2O_3$ moiety or portion and having a surface area of at least 4 $m^2/g$ are useful for scavenging hydrogen sulfide from other gases containing it. A cartridge type device is provided containing such particles intermixed with inert particulate matter, e.g. sand, useful as a means for scavenging hydrogen sulfide from such other gases.

4 Claims, 1 Drawing Figure

HIGHLY REACTIVE IRON OXIDE AGENTS AND APPARATUS FOR HYDROGEN SULFIDE SCAVENGING

CROSS-REFERENCE TO RELATED APPLICATIONS

This application is a continuation-in-part of Ser. No. 44,026 filed May 31, 1979, entitled "Process for Scavenging Hydrogen Sulfide from Hydrocarbon Gases", co-pending herewith, now U.S. Pat. No. 4,246,244 issued Jan. 20, 1981, and also of Ser. No. 963,797, filed Nov. 27, 1978, co-pending herewith, now U.S. Pat. No. 4,246,243 issued Jan. 20, 1981, each being continuations-in-part of prior applications as therein set forth, and as to its common disclosed subject matter, the benefit of the filing dates thereof is hereby claimed.

FIELD OF THE INVENTION

This invention relates to the use of certain particulate iron oxides to scavenge hydrogen sulfide from a gas containing same.

BACKGROUND OF THE INVENTION

In U.S. Pat. No. 4,008,775, issued Feb. 22, 1977, there is described a process in which porous iron oxide particles are used in drilling muds, primarily aqueous drilling muds, to scavenge hydrogen sulfide ($H_2S$) released from a well in the course of a drilling operation. This iron oxide is described as having an ideal composition of substantially $Fe_3O_4$, a particle size of about 1.5 to 60 microns and a surface area at least ten times as great as magnetite particles of equal size.

In co-pending application Ser. No. 44,026, filed May 31, 1979, assigned to the same assignee as the present application, the iron oxide (referred to as Compound A), described in the aforesaid patent, is further characterized as having an amorphous (non-crystalline) moiety of $Fe_2O_3$ together with an $Fe_3O_4$ crystalline phase. Further, in said application other non-oxide particles (referred to as Compounds B and C) are described; specifically, iron oxide waste dusts from open hearth or basic oxygen furnace steel-making operations, are somewhat similar to the iron oxide particles of said patent in that they have large surface areas and have an amorphous moiety of $Fe_2O_3$, and an $Fe_3O_4$ and $Fe_2O_3$ crystalline phase. Still another iron oxide composition (referred to as Compound D) having a high surface area and an amorphous $Fe_2O_3$ moiety and a crystalline $Fe_2O_3$ phase is described in said application. In said application it is also described that the aforesaid iron oxide particles are useful in scavenging $H_2S$ from hydrocarbon gases by bubbling such gases through a water suspension of such iron oxide particles. The description in said co-pending application relevant to Compounds AD is hereby incorporated herein by reference.

U.S. Pat. No. 4,089,809, issued May 16, 1978, discloses that $H_2S$ can be removed from producer gas by passing the gas (at very high temperatures) through a bed of pellets composed of silica and $Fe_2O_3$ thereby forming the crystalline reaction products FeS and $FeS_2$. This process is designed to remove $H_2S$ from the producer gas immediately after such gas if formed and, as noted, at high temperatures of the order of 1000°-1800° C., which is considerably higher than that of most gases, e.g. natural gas containing $H_2S$.

U.S. Pat. No. 4,201,751, issued May 6, 1980, describes a process of reducing the $H_2S$ content of noxious gases containing same by passing the gas through a bed of perlite, an alkaline agent and iron III-oxide in the form of dust developed during production of iron or steel. The reaction products formed are not specified and the process appears to be directed primarily to the use of alkaline agents and the treatment of gases at elevated temperatures.

My present invention does not require such extremely high temperatures. It is a process for scavenging $H_2S$ from gases using certain iron oxide particles which react with the $H_2S$ to form reaction products which for the most part are not crystalline, but are substantially amorphous; however, they are stable, and do not release significant quantities of $H_2S$ on contact with air.

OBJECTS OF THE INVENTION

It is an important object of the present invention to provide a novel process for scavenging hydrogen sulfide from gases containing same utilizing substantially dry iron oxide particles composed substantially of an $Fe_3O_4$ crystalline phase and an amorphous $Fe_2O_3$ moiety.

It is a further object of the present invention to provide a process for scavenging hydrogen sulfide from essentially oxygen-free gases containing same at moderate temperatures using substantially dry iron oxide particles to form substantially stable amorphous reaction products.

Another object is to provide a device to scavenge $H_2S$ from gases, comprising certain iron oxide particles in combination with inert particulate materials, together with means for containing such particles.

SUMMARY OF THE INVENTION

The present invention provides a method of scavenging hydrogen sulfide from gases by passing such gases into intimate contact with substantially dry particles of hydrogen-sulfide-reactive iron oxide preferably intermixed in a roughly equal quantity of inert particulate material such as sand. The oxide particles have a surface area of at least 4.0 m$^2$/g, a kinetic "K" value in excess of 1000 and are composed substantially of a crystalline phase of $Fe_3O_4$ together with an amorphous $Fe_2O_3$ moiety or portion. By the term "substantially dry" particles, as used herein, it is meant that the particles are free flowing and are either bone dry or contain such free moisture as they may pick up on being exposed to air at ambient temperatures and under ambient air humidity conditions, in which case they normally will contain less than 8% by weight of water. Although some crystalline sulfur and/or $FeS_2$ may be formed in the course of contacting if the hydrogen sulfide concentration is high and the contact time is prolonged, the bulk of the $H_2S$ reacts with the iron oxide to form substantially stable, amorphous reaction products.

Normally the process is practiced at moderate temperatures, for example, from about 15°-100° C., although somewhat higher or lower temperatures may be used.

The present invention also provides a device useful in practicing the above method, and which may provide for optimum reaction in a somewhat fluidized bed. This device comprises a shell or casing containing the aforementioned iron oxide particles in combination with inert solid particles, together with means for retaining such particles in the casing and inlet means for bringing a gas containing H₂S into contact with such particles in the casing and outlet means for permitting the contacted gas to escape from the casing. The device may also have means for heating and/or cooling the casing and its contents, as well as means associated with the inlet and outlet means, inter alia, to measure and/or control gas pressure and gas temperature and analyze the gas composition.

BRIEF DESCRIPTION OF THE DRAWING

The drawing is a schematic view of a dry iron oxide particles-gas contacting device embodying the present invention, positioned between a source of gas containing hydrogen sulfide and a delivery point for receiving the sweetened gas exiting from the device.

DESCRIPTION OF THE PREFERRED EMBODIMENT

Figure 1:
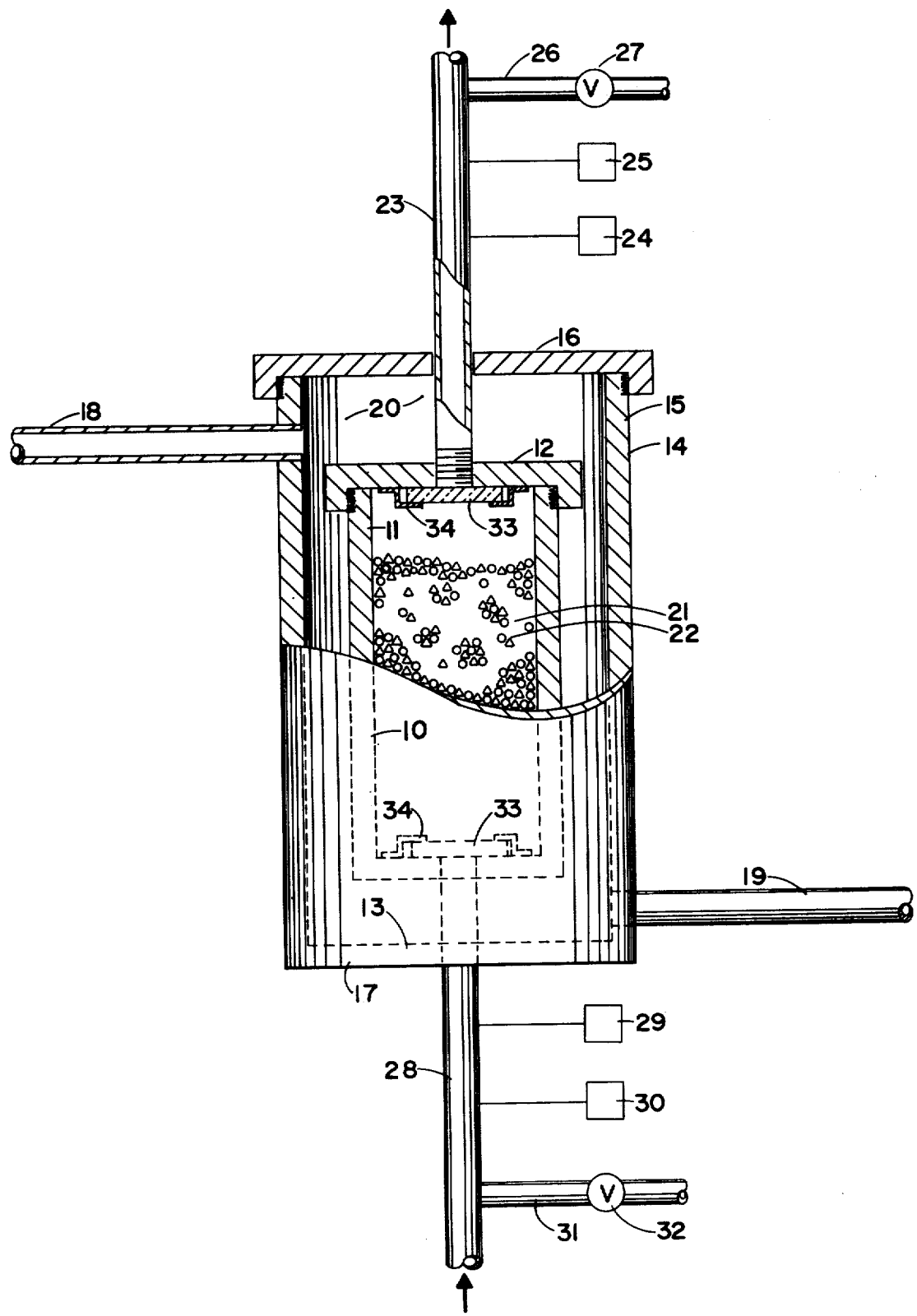

Before describing the method of the present invention in greater detail, the device which is preferably used in practicing the method will be described.

In the device shown, a vertically arranged cylindrical, solid-gas contacting casing generally designated 10 has a vertical wall 11, a top wall 12 and a bottom wall 13. Surrounding the casing is a cylindrical heating-/cooling jacket generally designated 14 having a vertical wall 15 spaced equidistant from vertical wall 11, and top and bottom walls 16 and 17, respectively, which are spaced equidistant from top wall 12 and bottom wall 13, respectively. The jacket 14 is also provided with an inlet/outlet pipe 18 and an inlet/outlet pipe 19, each of which may be provided with suitable valving (not shown) and connected to a heating or coolant source (not shown). The jacket 14 may be omitted if no heating or cooling of casing 10 or its contents is required, but if used for cooling, a fluid such as chilled water may be introduced from a source (not shown) into the space 20 through either pipe 18 or 19, as desired, and the fluid then exits from the jacket through the other pipe. Normally, in using the device, heat will be generated in casing 10 so that cooling fluid will ordinarily be circulated in the jacket to cool the casing and its contents. However, the casing may be heated, in similar fashion, by circulating a heated fluid, e.g. steam, through the jacket.

Inside of casing 10 are substantially dry iron oxide particles 21 (shown merely for convenience as greatly enlarged spherical particles), and sand or other chemically inert solid particles 22 (shown merely for convenience as triangular particles). Actually, particles 21 and 22 can be of the same or different configuration, but preferably are both of the same configuration, e.g. substantially or roughly spherical. In the preferred embodiment, a substantially homogenous mixture of roughly 50% by volume of sand particles and 50% by volume of iron oxide particles is employed, one purpose being to substantially eliminate or at least lessen the agglomeration of iron oxide particles 21 which tends to follow when such particles scavenge hydrogen sulfide in the casing. However, satisfactory results may be obtained by using a mixture of as little as 20% by volume of sand particles to 80% by volume of iron oxide particles.

Preferably, the particles occupy about 70% of the inner volume of the casing, although they may occupy a somewhat larger or smaller volume. Prior to use of the device, the particles will settle in casing 10 leaving a head space (that is, a free gas space above the particles) substantially equal to the remaining (for example, 30%) inner volume of the casing.

Entering through top wall 12 of casing 10 is an inlet/outlet gas pipe 23 through which a gas may be introduced into or exhausted from the casing. Pipe 23 is provided with a gas pressure measuring means 24, a gas temperature measuring means 25, and a sampling pipe or port 26 provided with valve means 27. Entering through bottom wall 13 of the casing is substantially the same kind of inlet/outlet pipe 28 provided with a gas pressure measuring means 29, a temperature measuring means 30, and a sampling line or port 31 having valve means 32. The inlet/outlet pipes 23 and 28 may be provided with flowmeters (not shown) to measure the rate of flow of gases through the device and with analytical instruments (not shown) to measure the H₂S content and other gas content of the entering or exiting gases.

Although the internal dimension of casing 10 between one side wall 11 of the casing and the other is shown as being larger than the internal diameters of pipes 23 and 28, they can be the same; that is, pipes 23 and 28 can be mere vertical extensions of casing 10.

Detachably mounted in casing 10 and covering the entrance of pipes 23 and 28 into it are particle retaining, gas porous members 33 which can be very fine wire mesh screens or fritted ceramic or sintered stainless steel discs or their equivalent which have passages or pores of smaller size than particles 21 and 22. These members serve to retain the particles in casing 10 while permitting the scavenged gas to escape from the casing through the outlet pipe. They are held by brackets 34.

In the preferred mode of operation of the device, a gas containing H₂S is introduced into casing 10 through pipe 28 and flows upwardly through the iron oxide and sand particles 21 and 22, thereby contacting the iron oxide particles 21 which scavenge or remove H₂S from the gas. The resultant sweetened gas then exits from the casing through outlet pipe 23. As the gas passes up through these particles, the particles become somewhat fluidized (that is, they separate from each other in the gas and rise to some extent into the head space) thereby effecting more complete contact between oxide particles 21 and the H₂S in the gas. However the sand particles 22 themselves serve, without such fluidizing, to assure distribution of the gas to the oxide particles 21. Therefore if channeling of the gas through the particles is a problem, the gas can be fed downward into the casing through pipe 23 and thence downward through the particles, in which case the particles become a fixed bed (thus minimizing channeling), and the sweetened gas exits the casing through pipe 28. A disadvantage of such downflow operation exists where the material is used to exhaustion; caking of the particles tends to occur in the bed after the H₂S breaks through the bed unscavenged and the pressure necessary to force the gas through the bed increases considerably. This effect of downflow operation is explained further in the specific examples.

The process of the invention is preferably practiced, as previously noted, by passing a gas containing the H₂S upward through a bed of the iron oxide particles intimately mixed with inert particulate matter, preferably sand particles. In this mode of operation it is possible to scavenge H₂S from the gas without substantial caking of the particles until the particles have exhausted their capacity to scavenge H₂S. Preferably, the iron oxide particles should contain some "free" water (absorbed from the atmosphere during storage) in addition to "bound" water, that is, water as is present in the particles after drying at a temperature of 100°-110° C. for 48 hours. If the particles do not contain some "free" water they will generate water rapidly on contact with the $H_2S$ and will tend to cake, causing considerable resistance to gas flow through the bed. Preferably, the particles contain at least 0.015%, and as high as 1 to 2% by weight of water, most desirably from about 0.05% to about 0.5%.

The inert particulate matter employed with the particles may be sand or any other siliceous material or any inert material which separates the iron oxide particles from each other and hence tends to prevent the iron oxide particles from agglomerating or caking. The particle size of the inert particles may be chosen to be somewhat similar to that of the iron oxide particles so that the two types of particles do not materially segregate during passage of the gas through the bed, but inert particles one hundred times as large as the oxide particles functioned as seen in the example which follows.

The gas contaminated with $H_2S$ employed in the process is preferably any gas which contains little if any oxygen, and can be a natural gas or any hydrocarbon gas exiting from a producing well, or a flue gas, producer gas, coke oven gas or the like. The present process is particularly suitable for scavenging $H_2S$ from natural gas. The $H_2S$ content of the gas is not critical and can be as high as 50% by volume. In the case of natural gas, the $H_2S$ concentration may be in the range of about 0.1 to about 5% by volume. By use of the present process, it is possible to reduce the $H_2S$ concentration of the sweetened gas to a commercially acceptable predetermined level of 4 ppm or less. Preferably, the scavenging process is practiced on gases at ambient atmospheric temperatures or on natural gases exiting from operating gas wells or earth formations and it has been found that the iron oxide particles used have a high $H_2S$ scavenging capacity under such conditions. The temperature of gases encountered under such conditions is usually in the range of about $-10°$ C. to about 50° C.

The preferred iron oxide particles employed herein have a particle size such that 90% of the particles are in the range of from about 1.0 to about 70 microns, a surface area of at least 4.0 $m^2/g$, a kinetic "K" value in excess of 1500 and an ideal composition of substantially $Fe_3O_4$ composed of a crystalline phase of $Fe_3O_4$ and an amorphous $Fe_2O_3$ moiety. A particularly suitable form of such iron oxide particles is described and characterized as Compound A in said co-pending application, and also herein. Such particles may also contain trace amounts of minerals as described in U.S. Pat. No. 4,008,775. Unlike the crystalline reaction products, obtained when such iron oxides are employed to scavenge $H_2S$ in liquid (aqueous or anhydrous liquid) systems, the reaction products obtained by the use of such iron oxides in the present process are substantially amorphous, believed to be substantially composed of amorphous sulfur and amorphous iron sulfides.

The following specific example is intended to illustrate the use of the device and the practice of the processes described herein, but is not to be construed as limiting the scope of the present invention.

EXAMPLE

A. Equipment Used:

(1) The equipment used was essentially as illustrated in the accompanying drawing except that the inner diameter of the cylindrical casing 10 was the same as that of the inlet and outlet pipes 23 and 28 and the particle retaining discs 33 were composed of sintered stainless steel. The casing portion, which was 40.64 cm high and had an internal diameter of 2.22 cm, was wrapped in a 2.54 cm wide and 0.32 cm thick insulation material and placed vertically in an insulation chamber. Seventy percent of the casing volume was filled with an intimate mixture of iron oxide particles (6-8 micron particle size) and dry sand (700 micron particle size) in equal weight ratios and obtained by mixing these ingredients on a roll mixer for one hour at 200 rpm, which mixture gave a settled bed depth of 28 cm. The head space above the mixture occupied about 30% of the volume of the casing.

(2) A mixture of nitrogen and $H_2S$ was supplied to the casing through pipes 23 or 28, depending on whether downward or upward flow through the mixture was used. The inlet and outlet flow rates were monitored with flowmeters. The pressure drop was measured with the aid of pressure gauges in the inlet and outlet lines. Gas sampling ports 26 and 31 consisted of Teflon ® coated septums. The gaseous effluent from casing 10 was bubbled through two caustic scrub traps (about 10% by weight aqueous NaOH before venting.

(3) Variations in $H_2S$ gas concentration were determined by the Draeger sampling method National Draeger, Inc., "Gas Samples Method," Bulletin No. ND103, 1980. This technique requires a fixed-volume pump (100 ml) and direct reading sample tubes for monitoring specific atmospheres. Once a gas sample was collected, it was drawn through a Draeger tube by the pump.

The sampling procedure required the collection of 1.0 ml gas sample using a gas-tight syringe (Pressure-Lok Series "A" Gas Vol. 0-10 ml, Precision Sampling Corp., Baton Rouge, LA). The feed gas was analyzed using a high capacity, $H_2S$-sensitive Draeger tube (100/s), (Vallen Corp., New Orleans, LA) with a range of 10,000-200,000 ppm (1.0-20%).

The product gas was analyzed by a more sensitive $H_2S$ Draeger tube (the 1/c), with a range of 100-20,000 ppm (0.01-2.0%). If the concentration exceeded the range of one tube, two or more tubes were employed in series.

After the infusion of $H_2S$ was completed and the reactor disassembled, the 1/c Draeger tube was used to analyze the atmosphere above the sample for $H_2S$, using the recommended sampling technique.

(4) After the process was carried out in the device, the mixture in the casing was sieved to separate the sand particles from the reaction products and any unreacted iron oxide, and the latter were ground to 200 mesh (74 microns) and dried in vacuum for 24 hours. X-ray spectra were run at 40 KV, 20 Ma, 500 cps using Cu-Ka. The reaction products were also subjected to analyses to determine the total amount of sulfur therein.

B. Materials Used:

(1) Hydrogen Sulfide of a minimum purity of 99.5%.

(2) Sand—dried at 110°-110° C. for 24 hours prior to use.

(3) Nitrogen—ultra high purity with less than 0.01% contamination.

(4) Compound A is composed of iron oxide particles having 98% of the particles of a size of 6-8 microns, a surface area of 10 $m^2/g$, a kinetic "K" value (as hereinafter defined) of 2000 and consisting essentially of a crystalline phase of $Fe_3O_4$ and an amorphous $Fe_2O_3$ moiety and traces of minerals in amounts less than 5% by weight. This material under ordinary ambient temperature and pressure conditions had a water content of about 0.3% by weight.

(5) Dry Compound A is the same as Compound A except it has been dried in a circulation oven at 100°–110° C. for a minimum of 48 hours and has a water content of 0.006% by weight. This material was desicated after drying to avoid rehydration.

TABLE 1, which follows, shows the conditions used in the equipment for scavenging $H_2S$ from nitrogen gas employing Compound A containing about 0.3% by weight of water, and the $H_2S$ reactive capacity of this Compound under these conditions. On the first run, gas upflow was employed to fluidize the bed; in the other runs the gas was flowed downward.

shows the extrapolated $H_2S$ reactive capacity at 100% completion.

The breakthrough capacity is the capacity of the iron oxide to scavenge $H_2S$ from the gas in grams of $H_2S$ scavenged per gram of Compound A at the time at which detectable quantities of $H_2S$ first appear in the gas stream after passage through the Compound A-sand bed.

TABLE 2

| Run No. | Iron Oxide Used | Breakthrough Capacity $\left(\frac{g\ H_2S}{g\ Cpd\ A}\right)$ | .10 Capacity $\left(\frac{g\ H_2S}{g\ Cpd\ A}\right)$ | .15 Capacity $\left(\frac{g\ H_2S}{g\ Cpd\ A}\right)$ | .50 Capacity $\left(\frac{g\ H_2S}{g\ Cpd\ A}\right)$ | 1.0 Capacity Completion $\left(\frac{g\ H_2S}{g\ Cpd\ A}\right)$ (extrapolated) |
|---|---|---|---|---|---|---|
| 1* | Compound A | 0.17 | 0.18 | 0.18 | 0.31 | 0.50 |
| 2 | " | 0.12 | 0.13 | 0.16 | — | — |
| 3 | " | 0.13 | 0.14 | 0.15 | 0.22 | 0.40 |
| 4** | " | 0.15 | 0.19 | 0.20 | 0.24 | 0.30 |

*indicates upflow of feed
**indicates feed [$H_2S$] = 43.7%

These results indicate that Compound A continues to scavenge $H_2S$ from the gas even after the breakthrough capacity is reached and that such potential capacity can be almost double or triple the breakthrough capacity.

TABLE 3, which follows, shows the x-ray crystallographic analyses data and total sulfur analyses of amorphous sulfur and amorphous iron sulfide reaction products plus crystalline reaction products such as crystalline sulfur, $FeS_2$ and $Fe_3S_4$ obtained in Runs 1–4 of TABLE 1.

TABLE I

| Run No. | Iron Oxide Used | Breakthrough Capacity (g $H_2S$/g Cpd A) | $H_2S$ Feed Concentration (%) | (cm/min) | Feed Rate (g/hour) | (cf$^d$) | Weight of Compound A (g) |
|---|---|---|---|---|---|---|---|
| 1* | Compound A | 0.17 | 16.3 | 260 | 3.84 | 13.2 | 107.8 |
| 2 | " | 0.12 | 21.4 | 158 | 3.06 | 8.02 | 93.5 |
| 3 | " | 0.13 | 23.7 | 105 | 2.28 | 5.33 | 96.6 |
| 4** | " | 0.15 | 43.7 | 220 | 8.76 | 11.2 | 94.6 |

*indicates upflow of feed
**indicates feed [$H_2S$] = 43.7%

The above results indicate that Compound A has a greater capacity for $H_2S$ scavenging when the gas is passed upward through the Compound A-sand bed than when the gas is passed downward through the bed.

TABLE 2, which follows, shows the $H_2S$ reactive capacity of Compound A at the breakthrough capacity and also at various capacities of Compound A when $H_2S$ is continued to be infused through the bed up to 50% of its total $H_2S$ reactive capacity. The last column

TABLE 3

| Run No. | Iron Oxide Used | Reaction Extent | Crystalline S (%) | $FeS_2$ (%) | $Fe_3S_4$ (%) | Total Sulfur in Reaction Product (%) |
|---|---|---|---|---|---|---|
| Standard | Compound A (as is) | — | N.D.+ | N.D.+ | N.D.+ | N.D.+ |
| 1* | Compound A (after reaction) | Completion | N.D. | N.D. | N.D. | 22.5 |
| 2 | Compound A (after reaction) | Breakthrough | 3.2 | N.D. | N.D. | 18.25 |
| 3 | Compound A (after reaction) | Completion | N.D. | 9.0 | N.D. | 13.04 |
| 4** | Compound A (after reaction) | Completion | 9 | 6 | <1 | 22.39 |

*indicates upflow of feed
**indicates feed [$H_2S$] = 43.7%
+N.D. - none detected The results in this table indicate that some crystalline reaction products are obtained when the gas contains higher $H_2S$ concentrations (Runs 2, 3 and 4), and that the reaction products contain substantial amounts of stable amorphous materials. These materials are believed to be essentially amorphous sulfur and amorphous iron sulfides.

As indicated previously in the description, there is a tendency for the iron oxide particles to cake or agglomerate over a period of time as a result of continued passage of the H₂S containing gas through the Compound A-sand bed. This phenomenon is illustrated by the data in TABLE 4, which follows, and is based on the Runs of TABLE 1.

TABLE 4

| Run No. | Iron Oxide Used | Reaction Extent | Back-pressure (psig) | Temperature Range (°C.) | Caking+ |
|---|---|---|---|---|---|
| 1* | Compound A | Completion | 1.5–3.0 | 20.3–23.4 | Minimal |
| 2 | Compound A | Breakthrough | 0–1.5 | N/A | Minimal |
| 3 | Compound A | Completion | 6.0–10.5 | 21.8–26.1 | Extreme |
| 4** | Compound A | Completion | 1.0–3.5 | N/A | Extreme |

+Caking is a physical phenomenon of the packed solids which prevents the removal of the products. Two types were observed and are briefly defined here:
 Minimal - some clumping; nothing more radical than minor tapping on the exterior of the reactor removed the product.
 Extreme - required driving product out of tubular reactor with a hammer and a steel rod.
*indicates upflow of feed
**indicated feed [H₂S] = 43.7%
N/A - not available It will be noted from TABLE 4 that caking of the bed is minimal when the H₂S concentration of the gas is lower (Runs 1 and 2) and the upflow mode is used (Run 1), whereas caking and higher back pressures are encountered when the H₂S concentration of the gas is higher and the gas flow through the bed is continued past the breakthrough point.

It should also be noted if Compound A is used in the dry state that is, without "free" water as defined in the description, the reaction with H₂S is so rapid that water is formed almost instantaneously on the surface of the iron oxide particles causing them to agglomerate and cake so that gas flow through the bed becomes difficult to sustain due to very high back pressure. This occurs, for example, when Compound A has been dried at a temperature of 100°–110° C. for 48 hours and has a water content of 60 mg per Kg of iron oxide or 0.006% by weight. To avoid such caking the iron oxide should contain some "free" water, preferably a water content of at least 0.015% by weight.

In contrast to the results obtained using the method of this invention, I have found that some other iron oxides give entirely different results, even contrary to those reported in the patent literature. Thus, I have found that Compound D (so designated in said co-pending application Ser. No. 44,026), when used in the method described in the above example, does scavenge H₂S but when the resulting reaction product is exposed to air sulfur dioxide is evolved and in some instances the reaction product ignites when exposed to a humid atmosphere. This result is contrary to that reported for ferric oxide in U.S. Pat. No. 4,089,809. Compound D is characterized in said co-pending application as being iron oxide particles having a surface area of 4 m²/g, a kinetic "K" value of 4000 and composed of a crystalline phase of Fe₂O₃ and an amorphous Fe₂O₃ moiety.

Also, I have found that Compound C (so designated in said co-pending application Ser. No. 44,026), when used in the method described in the above example, is essentially incapable of scavenging H₂S from a nitrogen-H₂S gas mixture in that the H₂S breaks through the bed of Compound C and sand shortly after the gas flow through the bed is started. This result is contrary to that reported in U.S. Pat. No. 4,201,751 although it should be noted that this patent requires the use of an alkaline agent with the basic oxygen furnace iron oxide material described therein. Compound C is characterized in said co-pending application as being iron oxide particles having a surface area of 4 m²/g, a kinetic "K" value of 100 and a crystalline phase of Fe₂O₃ and Fe₃O₄ and an amorphous Fe₂O₃ moiety.

In addition, I have found that when magnetite is employed in the method of the above example the magnetite is essentially incapable of scavenging H₂S from a nitrogen-H₂S gas mixture in that the H₂S breaks through the bed of magnetite and sand shortly after the flow of the gas through the bed is started. Magnetite is characterized in said co-pending application Ser. No. 44,026 as having a surface area of 1 m²/g, a kinetic "K" value of <1.0 and as being composed substantially of Fe₃O₄, of which the predominent part is believed to be a crystalline phase of Fe₃O₄. In regard to the Fe₃O₄ crystalline phase of magnetite this is the primary similarity to Compound A employed in the above example.

As to the kinetic "K" value, referred to in the foregoing description, in the pH range 8–10, the derived rate law for Compound A is as follows:

$$\frac{d[S_t]}{dt} = -K \times [S_t]^2 \times [H^+]^{1.06} \times [A]$$

wherein [$S_t$] is sulfide concentration in ppm, t is time in minutes, d[$S_t$]/dt is the instantaneous rate of change of dissolved sulfide concentrations, [H⁺] is hydrogen ion concentration and [A] is iron oxide concentration (lb./bbl.). K is the rate constant in min.⁻¹ ppm⁻¹ cm²× l/mole and equal to approximately 2000. At pH 8–10, the derived rate law agrees closely with Rikard's analysis of the reaction of hydrated iron oxide (ferric hydroxide) and hydrogen sulfide [Am. J. Sci., 274:941 (1974)]. When [$S_t$] and [H⁺] are measured intermittently during the course of continuous acid reaction the substitution of observed [$S_t$] and [H⁺] values into the rate law equation above yields apparent K values which define relative differences in reaction rates among different iron oxides.

A second such device as illustrated in the drawing may be connected in series with the first for assured efficiency. However, this appears to be unnecessary and in actual practice it is preferred to connect two such devices in parallel and employ only one of them to sweeten the gas until it loses its ability to do so, after which the gas is sweetened in the second device while the first device is prepared for further gas sweetening service.

While the device illustrated in the drawing is substantially as utilized in the laboratory tests reported, with up-flow of the gas for maximum fluidization, horizontal flow will fluidize the bed while avoiding caking and back pressures. Accordingly, especially where no heating or cooling is required, in an alternate form of device the casing has an annular configuration about a vertical axis, with an inner or central gas stream inlet (or outlet) port, a radially inner, preferably fibrous particle retaining annular filter, and, thence outwardly, a fill of the two types of particles as described, a radially outer annular fibrous filter, and a radially outer gas stream outlet (or inlet) port in the casing radially outer wall. Gas flow may be in either direction. The fill of the two types of particles, between the two fibrous annular filters, is loose, to a static level well above mid-level but somewhat below the upper wall of the casing, to leave a small head space; while the inlet and outlet ports are located below this static particle level. As the gas flows through the particles, they separate from each other and fluidize in the casing, effecting more complete reaction; while the location of the inlet and outlet gas ports below the static level of the particles avoids channeling of gas flow.

I claim:

1. A method of scavenging hydrogen sulfide from a gas containing the same which comprises
   (a) contacting said gas with substantially dry particles of a hydrogen sulfide-reactive iron oxide having a surface area of at least 4.0 $m^2/g$, a kinetic "K" value in excess of 1000 and composed substantially of a crystalline phase of $Fe_3O_4$ and an amorphous $Fe_2O_3$ moiety,
   (b) continuing said contacting until the hydrogen sulfide has reacted with said particles and its concentration in said gas has been reduced to a predetermined level, and
   (c) separating the gas so scavenged from said particles.

2. A method in accordance with that of claim 1, in which the gas to be contacted is substantially free of oxygen.

3. A method in accordance with that of claim 1, in which the gas to be contacted is substantially a hydrocarbon gas containing hydrogen sulfide and said gas is contacted with a substantially uniform mixture of from about 50 to 80% by weight of said iron oxide particles and from about 50 to 20% by weight of inert solid particles.

4. A method in accordance with that of claim 1, together with an intermediate step between step (a) and step (b) thereof, comprising
   in the course of such contacting, causing the gas to pass upward through said particles and the particles to separate from each other and fluidize in the gas,
   whereby to achieve more intimate contacting.

* * * * *